United States Patent [19]

Viletto

[11] Patent Number: 5,410,497
[45] Date of Patent: Apr. 25, 1995

[54] PORTABLE COMPUTER HAVING TWO DISPLAY UNITS

[75] Inventor: Giacomo Viletto, Maglione, Italy

[73] Assignee: Ing. C. Olivetti & C. S.p.A., Ivrea, Italy

[21] Appl. No.: 22,277

[22] Filed: Feb. 25, 1993

[30] Foreign Application Priority Data

Mar. 12, 1992 [IT] Italy .............................. TO92A0208

[51] Int. Cl.⁶ .............................................. G06F 3/14
[52] U.S. Cl. ............................ 364/708.1; 364/710.14
[58] Field of Search ................ 364/708.1, 707, 709.01, 364/709.1, 710.12, 710.14; 345/1, 3

[56] References Cited

U.S. PATENT DOCUMENTS

| | | | |
|---|---|---|---|
| 4,179,584 | 12/1979 | Tanimoto et al. | 364/710.12 |
| 4,266,096 | 5/1981 | Inoue et al. | 364/710.12 |
| 4,882,685 | 11/1989 | Van der Lely | 364/709.11 |
| 4,922,448 | 5/1990 | Kunieda et al. | 364/900 |
| 4,926,365 | 5/1990 | Hsieh | 364/708.1 |
| 5,068,652 | 11/1991 | Kobayashi | 364/708.1 |
| 5,196,991 | 3/1993 | Hsieh | 361/392 |
| 5,229,958 | 7/1993 | Oinuma | 364/709.01 |

FOREIGN PATENT DOCUMENTS 0419145  3/1991  European Pat. Off. .
0435317  7/1991  European Pat. Off. .

Primary Examiner—David H. Malzahn
Attorney, Agent, or Firm—Banner, Birch, McKie & Beckett

[57] ABSTRACT

A Portable computer comprises a base unit on which a lid is hinged. The base unit houses an electronic unit which can assume various operational states and carries an input unit. A display screen is carried by the lid and is controlled by the electronic unit to display graphic symbols and alphanumeric characters. The lid can be moved from an open position, allowing access to the input unit and allowing the screen to be seen, to a closed position. A mode indicator is carried by the base unit and displays various characters and symbols indicating different operational states of the computer. A viewing zone provided in the lid enables the mode indicator to be seen when the lid is closed.

17 Claims, 5 Drawing Sheets

PORTABLE COMPUTER HAVING TWO DISPLAY UNITS

FIELD OF THE INVENTION

The present invention relates to a portable computer comprising a base unit having an upper surface on which a lid is hinged, an electronic unit housed in the base unit and capable of assuming various operational states, an input unit for controlling the electronic unit and a display screen carried by the lid and controlled by the electronic unit to display graphics symbols and alphanumeric characters over several lines and, in which the lid can be positioned between a closed configuration and an open configuration and in which the lid, in its closed configuration, is superimposed over the upper surface of the base unit thereby protecting the input unit and screen and, in its open configuration, allows access to the input unit and enables the display screen to be seen.

BACKGROUND OF THE INVENTION

Many examples of portable computers of this type are known in which, inevitably, it is only possible to view visual information as to the operational state of the electronic unit when the lid is in its open configuration and the display screen is visible.

European Patent Application No. EP-A-0,419,177 discloses one example of a computer of the type defined above which is battery-powered and in which various operational states of its electronic unit are provided. These states concern audio signal processing. In particular, the functions connected with recording and playback can be preset using buttons on one side of the computer which can be actuated when the lid is closed. In the recording state, the audio signals coming from a microphone are recorded in a memory by the computer after they have undergone analogue/digital conversion. Conversely, in the playback state, the signals recorded in the memory are played back by a speaker, after they have undergone digital/analogue conversion. In this example, no visual information is available as to the state of the electronic unit after the buttons have been actuated. This proves to be a particular disadvantage with respect to the functional autonomy provided by the batteries if the computer is in an operation state which has been mistakenly selected

SUMMARY OF THE INVENTION

Preferred embodiments of the invention provide a portable computer fitted with a lid to protect the screen and in which it is possible to view the operational state of the electronic unit when the lid is closed.

One embodiment of the invention provides a computer in which a mode indicator is carried by the base unit for displaying symbols and characters which indicate the operational state of the computer. The lid is provided with a viewing zone, external to the display, through which the mode indicator may be viewed when the lid is in its closed position. The mode indicator is usually smaller in size than the display screen.

In another embodiment of the invention the computer includes an audio processing unit. The lid carries a series of presetting keys which are accesible when the lid is closed. These can be used to preset various operational states of the computer such as record or playback for the audio processing unit.

The invention in its various aspects is defined in more detail in the appended claims to which reference should now be made.

BRIEF DESCRIPTION OF THE DRAWINGS

Preferred embodiments of the invention will now be described in detail by way of example with reference to the drawings in which.

DETAILED DESCRIPTION OF PREFERRED EMBODIMENTS

Figure 1:
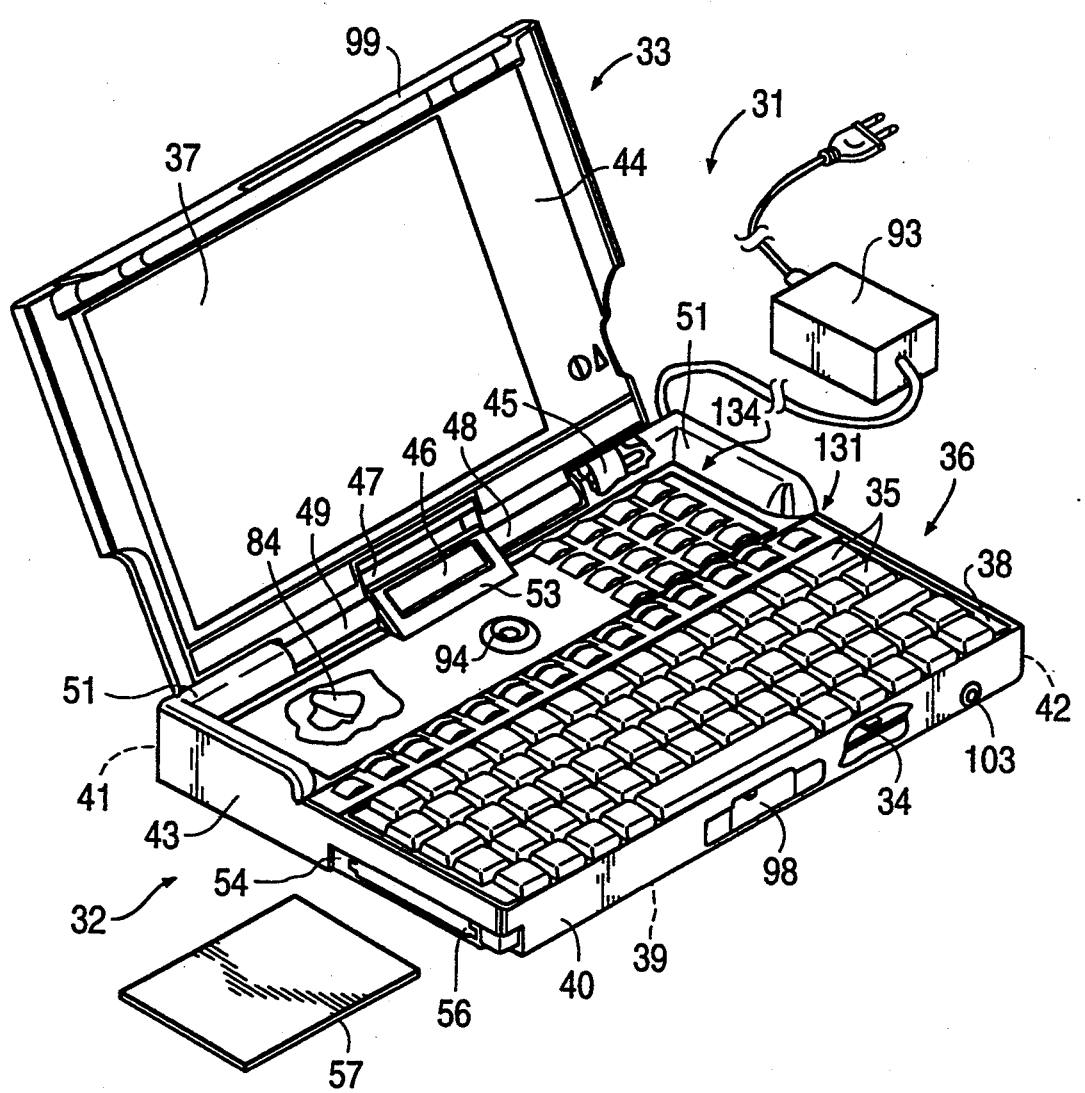
FIG. 1 shows a perspective view of the computer according to the invention in its working configuration.

With reference to FIGS. 1 to 4, the portable computer, referenced 31, is of the multifunctional type and comprises a base unit 32, a lid 33 hinged to the base unit 32 and which can be positioned between a closed configuration (FIG. 2) and an open configuration (FIG. 1), an electronic unit 34, housed in the base unit 32 and comprising keys 35 on a keyboard 36, for controlling the electronic unit 34, and a display screen 37 carried by the lid 33 and controlled by the electronic unit 34 to display graphic symbols and alphanumeric characters over several lines.

The base unit 32 has a substantially parallelepipedal, somewhat flattened, shape and has an upper surface 38 which is horizontal in use, a bottom 39, a front part 40, a rear part 41, a right side 42 and a left side 43. The lid 33 has a front surface 44 and the screen 37 is of the flat type and covers most of the surface 44.

The lid 33, in its closed configuration, superimposes the surface 44 over the upper surface 38 of the base unit 32, thereby protecting the keyboard 36 and the screen 37. In its open configuration, the lid can assume various positions about a vertical position, allowing access to the keyboard 36 and enabling the display screen 37 to be seen. In particular, the base unit 32 (FIG. 1) has an edge on which the lid 33 is hinged on the rear part 41 and on the upper surface 38 and the lid 33 has an edge on which the unit 32 is hinged on one of its rear edges.

Figure 2:
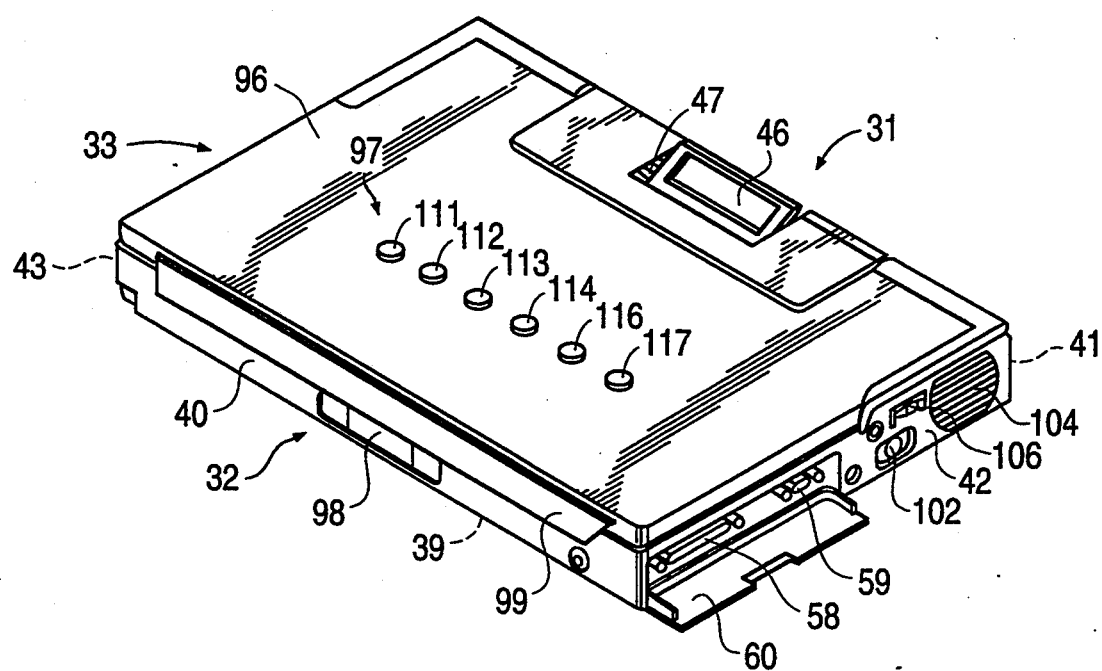
FIG. 2 shows a perspective view of the computer in FIG. 1 in a different working configuration.
Figure 3:
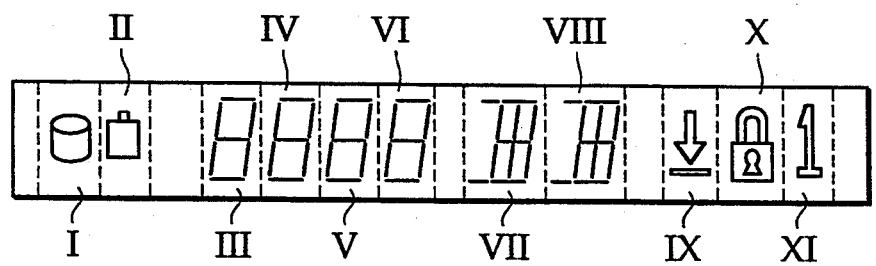
FIG. 3 shows a detail from the computer in FIG. 1.

The computer 31 also comprises a mode indicator 46, smaller in size than the screen 37 and carried by the base unit 32, for displaying characters and symbols indicating various operational states of the computer. The lid 33 in turn comprises a viewing zone 47, in its lower part external to the screen 37, so that the mode indicator 46 can still be seen when the lid is in the closed configuration (FIG. 2).

The mode indicator 46 comprises a display panel of the liquid crystal type which is adjacent to the hinged edge of the base unit. The viewing zone 47 is adjacent to the hinged edge of the lid 33 and is provided so that the indicator 46 can still be seen when the lid is in its open configuration. Flat, flexible cables 45 in turn connect the electronic unit 34 inside the unit 32 to the screen 37, across the hinging zone between the unit 32 and the lid 33.

The lid 33 comprises two side sections 48 and 49 which project from its hinged edge so as to engage with two corresponding side sections 51 and 52 of the base unit 32, which project from its upper surface 38. The viewing zone 47 consists of a bay between the projecting sections 48 and 49.

The indicator panel 46 is located on one face of a substantially prismatic support 53 and faces towards the front part of the computer, at an angle of 30 relative to the upper surface 38 of the base unit 32. The support 53 is partially housed in the bay 47 in both the open and closed configurations of the lid. In this way the panel 46 can be seen easily across the bay 47 both when the lid 33 is closed and when it is open in its vertical working position.

The computer 31 is very compact, of the palm held type, having base dimensions equivalent to those of a notebook of standard A5 format, i.e. approximately 210×148 mm and a thickness of approximately 32 mm, in the closed configuration.

The lid 33 is also of A5 size, the display screen 37 is a 7" screen of the reflecting liquid crystal type, equivalent to an active area of approximately 141×106 mm and with rectangular dots of 0.24×0.20 mm, for displaying figures with a graphics resolution of 640×400 dots and for displaying 25 rows of alphanumeric characters over 80 columns.

The mode indicator panel has an active area of approximately 40×8.5 mm and has eleven positions I–XI, enabling five graphic symbols and six alphanumeric characters to be displayed.

On its side 43, the computer comprises a slot 54 with a connector 56 for data and program exchange using a microprocessor (IC) card 5, for example of the JEIDA, PCMCIA type. On its side 42 the computer 31 also comprises a parallel connector 58 and a serial connector 59 (RS-232 type) for data exchange via external lines, with external peripherals such as modems, display devices, printers and external bulk memories. The connectors 58 and 59 can be covered by a small lid 60.

Figure 4:
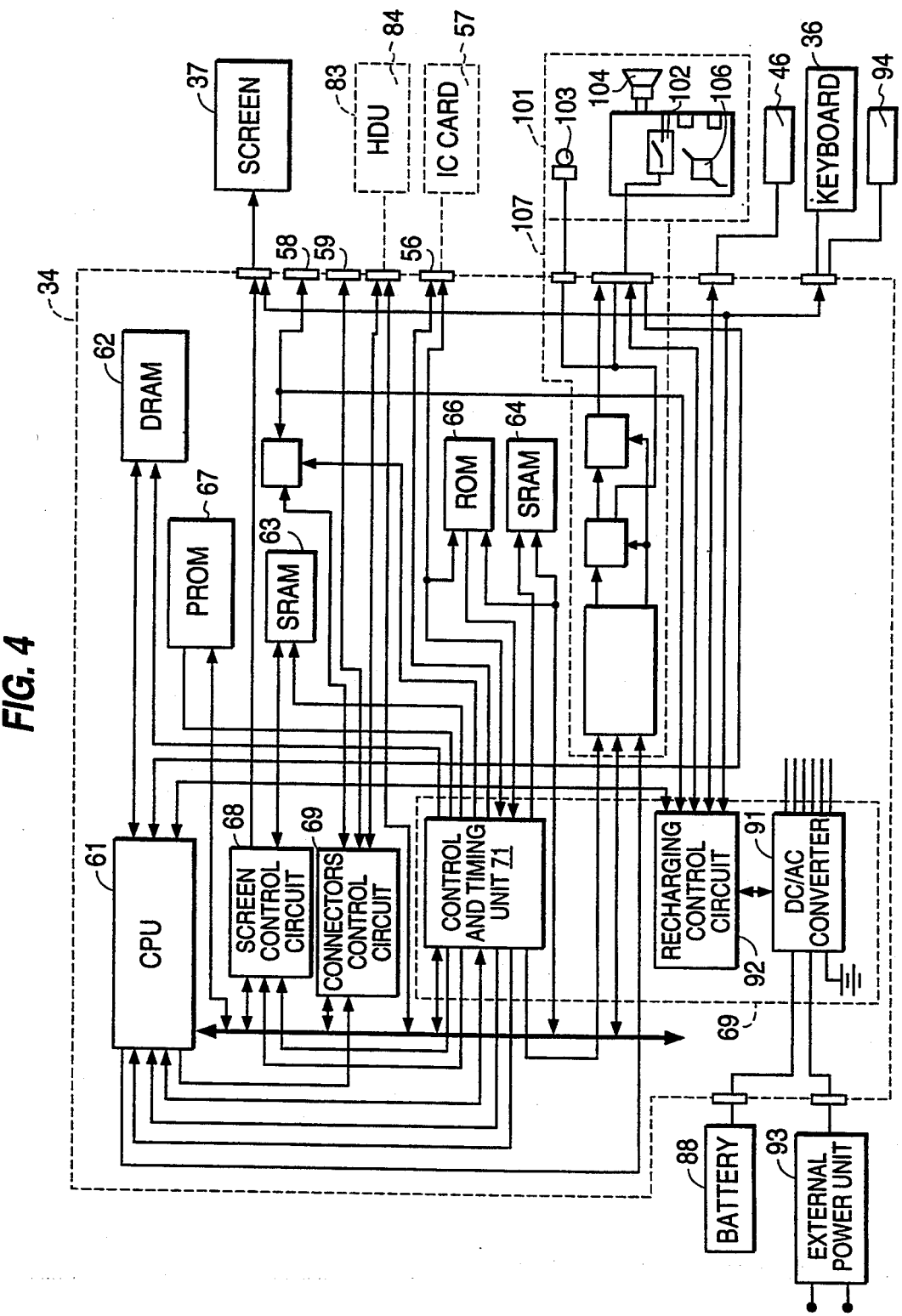
FIG. 4 shows an electrical block diagram of the computer of the invention.

With reference to FIG. 4, the electronic unit 34 comprises a central processing unit (CPU) 61, a main dynamic type memory (DRAM) 62, static type memories (SRAM) 63 and 64, a read only memory (ROM) 66 and a programmable read only memory (PROM) 67. The unit 34 further comprises control circuits 68 and 69, for the screen 37 and for the connectors 58 and 59 respectively and a control and timing unit 71 for the memories 62, 63, 64, 66 and 67, for the control circuits 68 and 69 and for the CPU 61.

The CPU 61 consists, for example, of an NEC V30HL microprocessor, operating at 16 mHz. The DRAM 62 has a memory of one MByte and the SRAMs 63 and 64 are dedicated to the screen 37 and to the external lines and have a capacity of 32 kBytes and 128 kBytes respectively. The control circuit 68 is for example of the 82C426 type whereas the control circuit 69 is of the PC87310 type. The DOS programs are permanently recorded in the ROM 66, whereas the BIOS programs are permanently recorded in the PROM 67.

The computer 31 also comprises a non-volatile bulk memory 83, for exchanging data with the electronic unit 34. This memory can preferably comprise a hard disk unit (HDU) 84, fixed inside the base unit 32. Some of the keys 35 on the keyboard 36 are preset to access bulk memory 83, and the mode indicator 46 has a bulk memory symbol, in the position I (FIG. 3), which can be displayed to indicate that the bulk memory has been activated by the unit 34.

A set of batteries 88 (FIG. 4) can be housed in the unit 32 and is capable of powering the electronic unit 34 via its power supply control circuit 89 in order to power the various functions of the computer 31.

The control circuit 89 comprises a DC/DC converter 91 and a recharging control circuit 92 and defines reduced power and limited operational states of the computer 31 so as to limit energy consumption from the batteries 88 whenever some of the potential functions of the computer are not being exploited. The batteries 88 are rechargeable and the computer 31 can be connected to an external power unit 93 so as to operate on an external power supply and recharge the said batteries.

The circuit 92 is connected to a main switch 94 which projects from the upper surface 38 of the base unit 32 and can be actuated when the lid 33 in its open configuration, in order to preset the electronic unit 34 for operational modes associated with the open configuration of the lid 33.

The control circuit 92 also transmits signals to the indicator 46 so that it may display alphanumeric character is in the positions VII and VIII, such as to represent the limited operational states preset by the said circuit 92. A graphic symbol representing a battery in the position II on the indicator 46 can further be activated by the circuit 92 to display that there is an insufficient charge in the batteries 88. In the closed configuration of the lid, this symbol can be also seen in the rest state of the electronic unit.

The lid 33 (FIGS. 1 and 2) has a surface 96 on the opposite side from the surface 44 which is accessible from the outside when the lid is in the closed configuration. The surface 96 carries six presetting keys 97 which are connected to the electronic unit 34 via the cables 45 and can be actuated by an operator in order to preset some of the operational states of the computer 31, when the lid 33 is in the closed configuration.

On its front part 40, the base unit 32 carries a toothed key 98 in an elastically yielding manner. The lid 33 in turn comprises a strip 99 having a notch which engages with the toothed key 98 when the lid is in its closed configuration. In this way the lid 33 can be locked in the position reached. Pressure exerted on the key 98 releases the strip 99 from the toothed key 98 enabling the lid to be opened once again.

In the rest state, the electronic unit 34 is preset to activate a clock function which gives the actual time in the positions III–VI of the mode indicator 46.

The computer 31 according to the invention also comprises a voice input/output unit 101, selection means for selecting a voice-command state of the computer for processing verbal commands, and presetting means comprising the presetting keys 9 to preset the different operational conditions of the electronic unit 34 in the voice-command state. The unit 101 in particular comprises a microphone 103 located on the front part 40 of the base unit 32 and a speaker 104 with a volume control 106 located on the right side 42. Finally, the selection means comprise a change-over switch 102 which is also located on the side 42.

The electronic unit 34 also comprises a voice-conversion unit (DSP) 107 which is preset to sample the analogue signals coming from the microphone 103 in response to the sounds received, in particular verbal commands, and convert these signals into digital signals which can be processed by other circuits in the same unit 34. The unit 107 is also preset to convert digital signals coming from other circuits in the unit 34 into analogue signals to be reproduced as sounds by the speaker 104.

The verbal commands, in their digital form as processed by the conversion unit 107, can be stored in the bulk memory 83 consisting of the HDU 84 or of the IC card 57. The mode indicator 46, in response to the various operational conditions selected in the voice-command state, displays two symbols indicating the selected operational state in the positions VII and VIII, as well as indicating that the bulk memory has been activated.

The bulk memory 83 is divided up into partitions having several locations, able to store a specific verbal command as a message, and the electronic unit 34 controls a pointer as appropriate in order to access each partition of the memory and sequential locations within the selected partition in order to access various parts of the message.

The mode indicator 46 is able to display, in the position III-VII, time information in minutes and seconds, relating to the verbal commands already processed, in the state indicated in the positions VII and VIII.

The presetting keys 97 comprise rewind a RW key 111 to move the pointer quickly from a current location in the memory 83 back to preceding locations, a PAUSE key 112 to stop recording or playback of the verbal commands, a STOP key 113 to put the computer into a state of rest, stopping recording or playback of the verbal commands, a record (REC) key 114 to record a verbal command starting from the current location in the memory 83, a PLAY key 116 to play back verbal commands starting from the current location and a fast forward (FF) key 117 to move the pointer quickly forward to subsequent locations in the memory, in a way similar to the way in which a magnetic tape recorder/player is operated.

The keys 111, 112, 114, 116 and 117 are substantially aligned with each other, parallel to a plane of symmetry of the surface 96 of the lid 33. These keys are positioned approximately 45 mm from the front edge of the lid 33, to enable the operator to operate them using the fingers of the hand holding the computer 31.

Routines 118, 119, 121, 122, 123 and 124 which respond when the six keys 97 are depressed are provided in the ROM 66 of the electronic unit 34, in order to activate respective fast rewind, pause, stop, record with insertion, playback and fastforward functions, preset by actuating the RW, PAUSE, STOP, REC, PLAY and FF keys respectively.

The indicator 46 will display the bulk memory symbol in the position I and the symbols RW, PA, ST, IN, PL and FF in the positions VII and VIII, accordingly, to indicate the activated key. Moreover, the routine 119 responds to repeated pressing of the FF key 112 to move the pointer quickly on to the last location of the selected partition and the routine 122 responds quickly back to the first location of the memory partition.

The routine 119 responds to the PLAY key 111 and the FF key 112 being pressed simultaneously to forward (with scanning) the pointer at a speed only slightly faster than the playback speed and displays this state using the symbols FS in the positions VII and VIII on the indicator 46.

The routine 122 in turn responds to the PLAY key 11 and the RW key 114 being pressed simultaneously to move the pointer back (with scanning) at a speed only slightly faster than the play back speed and displays this state using the symbols RS on the indicator 46.

Finally, the routine 123 responds to the PLAY key 111 and the REC key 116 being pressed simultaneously to overwrite verbal commands on existing recordings, starting from the current location, and indicates this state using the symbols OW.

The computer 31 stores a series of modules for personal programmes in the ROM 66, so as to extend its functional range. These are as follows:

NOTES: for word processing;
CALC: for performing algebraic operations as in a calculator;
DIARY: for recording and reviewing appointments, planning daily or weekly activities, together with a calendar function;
ADDRESS_BOOK: for storing lists of names, addresses and telephone numbers and enabling access via modem;
FILES: (file manager) for DOS operations in Directory, File, Locate, Info, Format and Quit;
CARDS: for using project lists having simple database characteristics;
VOICE: for activating the voice-command state and the functions provided for processing verbal commands;
MENU: for presetting personalised features of the computer relating to screen characteristics and functions concerning energy saving.

These programs are presented as menu lines on the screen 37 and, after the computer has been activated, the operator can choose the desired program by moving a cursor and confirming in a manner known per se.

The keyboard 36 (FIG. 5) is similar to that of a standard personal computer (PC) with 102 keys (now shown in the drawings) and can directly call up most of the functions which can be directly called up by the keyboard of a standard PC. In particular, the keyboard 36 has sixty-four alphanumeric character and control keys including an ENTER key, CTRL and ALT control keys, five cursor keys 131 and one key (FN) for new functions 132.

The keyboard 36 also comprises a row of fourteen function keys 133, including an ESC key, ten function keys F1-F10 and three keys: Print, Scroll Lock and Puse, equivalent to the corresponding function keys on a standard PC. Finally, a numbers keyboard 134 is provided having an additional sixteen number and mode keys, similar to the numbers keyboard of a standard PC, and comprising the usual Num Lock key. The presettings of the functions activated by the Scroll Lock, Caps Lock and Num Lock keys are displayed in the positions IX-XI respectively of the mode indicator_46.

In this way, ninety-seven functions of a standard PC keyboard can be activated directly via the keyboard 36. Only the function keys FII, F12, right ALT, right CTRL and ENTER of a standard PC are missing. However, these functions can be activated by pressing the key 132 together with the keys F1, F2, ALT, CTRL and ENTER. In this way these keys will respectively activate those functions which, in a standard PC, are activated by the keys F11, F12, right ALT, right CTRL and the ENTER key of numbers keyboards.

The keys F3-F9, pressed together with the FN key 132, additionally activate the programs NOTES, CALC, DIARY, ADDRESS BOOK FILES, CARDS and VOICE respectively. The F1 key has the function of a HELP key and the F10 key a menu command function. The operator may thus also activate the voice-command state of the VOICE program by pressing the FN and F9 keys at the same time.

In the VOICE program, the keys F3–F8 double up for the RW, PAUSE, STOP, REC, PLAY and FF keys on the lid 33 so as to define the same operational conditions which can be preset by the keys 97, while the lid 33 is in its open configuration. The corresponding operative states of the unit 34 will be displayed in the positions I, VII and VIII on the mode indicator 46, with the same symbols already described in connection with the keys 97.

Figure 5:
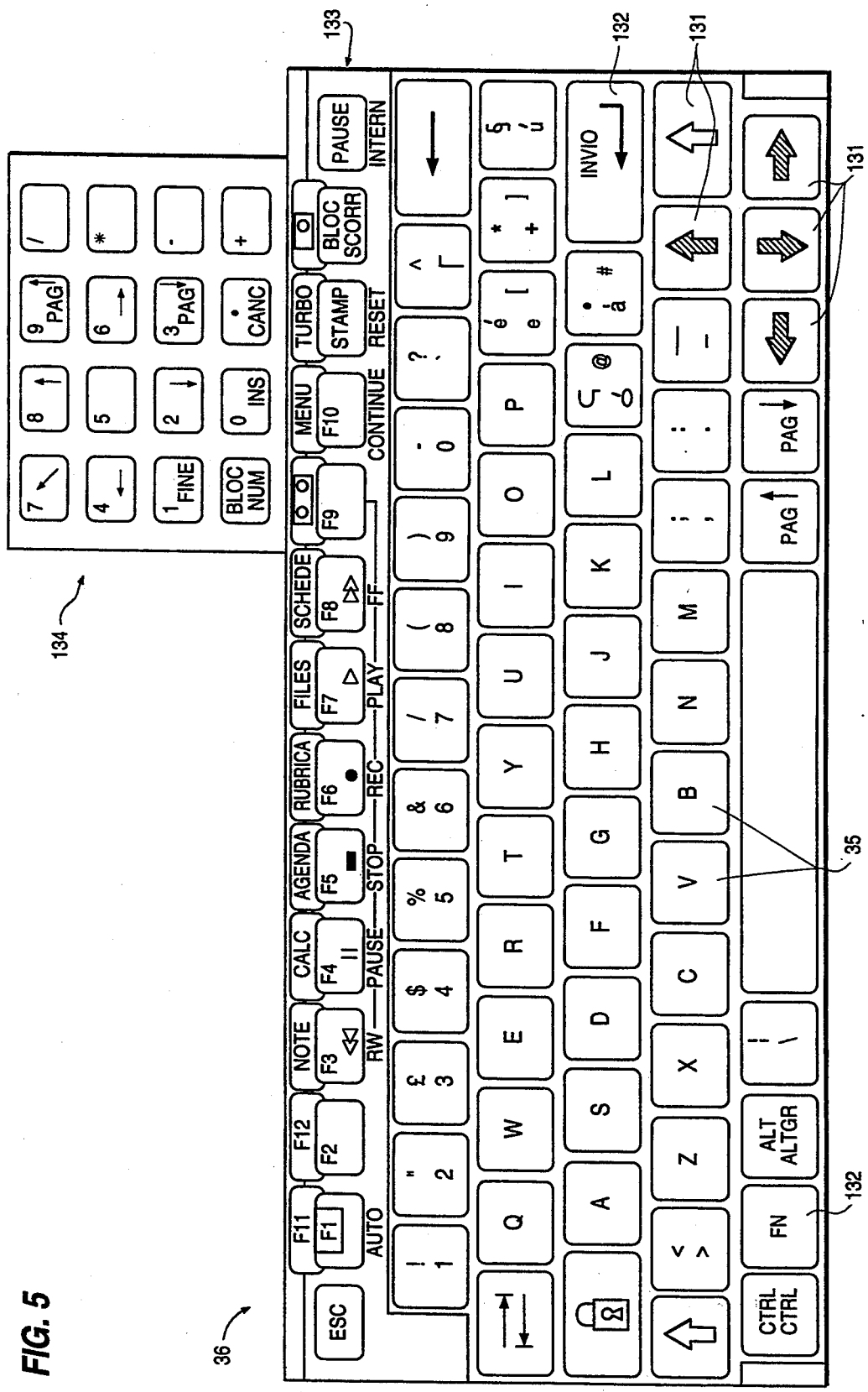
FIG. 5 shows a view of the detail of the computer in FIG. 1.
Figure 6:
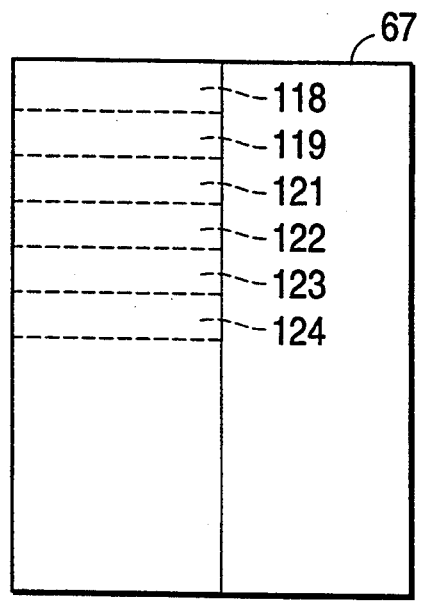
FIG. 6 is a detail of the electrical diagram in FIG. 4.

With reference to FIGS. 1, 4 and 5 the keys have a 14 mm pitch, approximately. It results clear that the plane of the keyboard 36 has a first (front) fraction and a second (rear) fraction. The alphanumeric and control keys of the keyboard 36 fully take the first fraction of the keyboard plane in the base unit 32 which represents a little more than 50% of the minor side in the keyboard plane. The numbers keyboard 134 takes a lateral portion of the rear fraction of the keyboard plane and will result adjacent to the mode indicator 46.

The numeric keyboard 134 comprises four rows of keys, each one of four keys. Therefore the layout of all the keys of the keyboard 36 will simulate very close the layout of the keys in a standard PC (apart from the difference in the position of the numeric keyboard 134), in spite of the limited dimensions of the computer 31 (210×148 mm).

The hard disk unit (HDU) 84 is of a thin profile type for disks of 2,5" and the numeric keyboard 134 results offset with respect to the unit 84. A portion of the side 42 of the base unit 32 projects upwardly with respect to the keyboard plane 136 and the speaker 104 lies on the projecting portion of the side 142 for a space optimization of the base unit 32.

It is understood that the portable computer 31 may undergo various changes and improvements, with respect to both shape and arrangements of the various parts, without departing from the scope of the present invention.

What I claimed is:

1. A portable computer comprising:
    a base unit having an upper surface and a hinge edge;
    a lid having a hinge edge hinged on the corresponding hinge edge of said base unit:
    an electronic unit housed in said base unit and capable of assuming various operational states;
    an input unit for controlling said electronic unit;
    a display screen carried by said lid and controlled by said electronic unit to display graphics symbols and alphanumeric characters over several lines; and
    a mode indicator carried by said base unit, for displaying characters and symbols indicating different operational states of the computer, said mode indicator comprising a display panel smaller in size than said display screen and adjacent to said hinge edge of said base unit;
    wherein said lid can be moved between a closed configuration and an open configuration and in its open configuration allows access to the input unit and enables said display screen to be seen;
    wherein a viewing zone is provided adjacent to said hinge edge of said lid, external to said display screen, so that said mode indicator is visible with said lid in its closed configuration, so that said display panel can still be seen when said lid is in its open configuration, and
    wherein said lid comprises two side sections which project from its hinge edge so as to engage with two corresponding side sections which project from said base unit and said viewing zone comprises a bay between said side sections which project from said base unit.

2. A portable computer according to claim 1, wherein said display panel is inclined at an angle of 30 relative to said upper surface of said base unit.

3. A portable computer according to claim 1 or 2, wherein said display panel is partially housed in said bay in the open and closed configurations of said lid.

4. A portable computer comprising:
    a base unit having an upper surface;
    a lid hinged on said upper surface;
    an electronic unit housed in said base unit and capable of assuming various operational states;
    an input unit for controlling said electronic unit;
    a display screen carried by said lid and controlled by said electronic unit to display graphics symbols and alphanumeric characters over several lines;
    a mode indicator carried by said base unit, for displaying characters and symbols indicating different operational states of the computer; and
    keys for presetting operational states of the computer;
    wherein said lid can be moved between a closed configuration and an open configuration and in its open configuration allows access to the input unit and enables the display screen to be seen;
    wherein a viewing zone is provided in the lid, external to the display screen, so that the mode indicator is visible with the lid in its closed configuration;
    wherein the mode indicator is smaller in size than the display screen, and
    wherein said keys are carried in a surface of said lid which is accessible from outside in said closed configuration of said lid.

5. A portable computer according to claim 4, wherein said keys carried in said lid comprise the PLAY, FF, STOP, RW, REC and PAUSE keys substantially aligned with each other.

6. A portable computer according to claim 5, wherein said keys are aligned parallel to an edge of said base unit and at a distance from said edge wherein they may be actuated using fingers of a hand holding said computer.

7. A portable computer comprising:
    a base unit having an upper surface;
    a lid hinged on said upper surface;
    an electronic unit housed in said base unit and capable of assuming various operational states;
    an input unit for controlling said electronic unit;
    a display screen carried by said lid and controlled by said electronic unit to display graphics symbols and alphanumeric characters over several lines;
    a mode indicator carried by said base unit, for displaying characters and symbols indicating different operational states of the computer;
    a voice input/output unit;
    selection means for selecting a voice-command state of the computer for processing verbal commands;
    presetting means for presetting various operational conditions of said electronic unit in a voice-command state; and
    a memory for storing verbal commands;
    wherein said lid can be moved between a closed configuration and an open configuration and in its open configuration allows access to the input unit and enables the display screen to be seen;

wherein a viewing zone is provided in the lid, external to the display screen, so that the mode indicator is visible with the lid in its closed configuration;

wherein the mode indicator is smaller in size than the display screen;

wherein said mode indicator is provided to display various operational conditions of said computer in said voice-command state; and wherein said electronic unit controls a pointer in order to access verbal commands in various linked partitions of said memory and in sequential locations in said partitions.

8. A portable computer according to claim 7, wherein said mode indicator is able to display time information relating to said verbal commands.

9. A portable computer according to claim 7, wherein said presetting means comprise:

a PLAY key to play back verbal commands starting from a current location in a selected area of the memory; an FF key to move the pointer quickly forward to subsequent locations in the selected area;

a STOP key to put the computer into a state of rest, stopping recording or playback of the verbal commands;

an RW key to move the pointer quickly back to preceding locations in said selected area of the memory;

a REC key to record a verbal command starting from a current memory location; and, a PAUSE key to stop recording or playback of the verbal commands.

10. A portable computer according to claim 9, comprising means within said electronic unit which respond to repeated pressing of said FF key to move said pointer quickly on to a last location of said selected area of memory.

11. A portable computer according to claim 9, comprising means within said electronic unit which respond to repeated pressing of said RW key to move said pointer quickly back to a first location of said selected area of memory.

12. A portable computer according to claim 9, comprising means within said electronic unit which respond to said PLAY key and said REC key being pressed to overwrite verbal commands on existing recordings, starting from a current location.

13. A portable computer according to claim 9, wherein said mode indicator is provided to display operational conditions selected by said PLAY, FF, STOP, RW, REC and PAUSE keys in said voice-command state.

14. A portable computer according to claim 7, wherein said input unit of said computer comprises a keyboard having a row of function keys (F1–F10) with a set of keys which are operational when said lid is in said open configuration to define suitable operational conditions for said computer in said voice-command state.

15. A portable computer according to claim 14, wherein said function keys (F1–F10) comprise keys which double up for functions of said keys of said presetting means located on said lid.

16. A portable computer according to claim 7, wherein said input unit comprises a row of function keys with a NOTES key which can be actuated for selecting said voice-command state.

17. A portable computer according to claim 7, further comprising a bulk memory (HDU, IC) which can be linked to said electronic unit; and means for accessing said bulk memory; wherein said mode indicator displays a symbol to indicate that said bulk memory is linked to said electronic unit; and wherein said memory for storing verbal commands forms part of said bulk memory.

* * * * *